United States Patent
Geethanath et al.

(10) Patent No.: US 12,430,424 B2
(45) Date of Patent: Sep. 30, 2025

(54) ANOMALOUS PATTERN DETECTION FOR CONTROL OF COMPUTER NETWORKS

(71) Applicant: Microsoft Technology Licensing, LLC, Redmond, WA (US)

(72) Inventors: Ananth Geethanath, Bothell, WA (US); Ali Alam, Sammamish, WA (US); Shankaranand Arunachalam, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 211 days.

(21) Appl. No.: 18/020,909

(22) PCT Filed: Aug. 18, 2021

(86) PCT No.: PCT/US2021/046577
§ 371 (c)(1),
(2) Date: Feb. 10, 2023

(87) PCT Pub. No.: WO2022/072078
PCT Pub. Date: Apr. 7, 2022

(65) Prior Publication Data
US 2023/0353588 A1 Nov. 2, 2023

(30) Foreign Application Priority Data

Sep. 29, 2020 (LU) ...................................... 102090

(51) Int. Cl.
*G06F 21/55* (2013.01)
*H04L 9/40* (2022.01)
(Continued)

(52) U.S. Cl.
CPC .......... *G06F 21/552* (2013.01); *H04L 41/064* (2013.01); *H04L 43/16* (2013.01); *H04L 63/1425* (2013.01); *H04L 43/08* (2013.01)

(58) Field of Classification Search
CPC ..... H04L 43/16; H04L 41/142; H04L 43/062; H04L 43/08; H04L 63/1408;
(Continued)

(56) References Cited

U.S. PATENT DOCUMENTS 8,688,620 B2   4/2014  Viswanathan et al.
9,471,778 B1  10/2016  Seo et al.
(Continued)

OTHER PUBLICATIONS

Communication under rule 71(3) received for European Application No. 21766354.1, mailed on May 23, 2024, 9 pages.
(Continued)

*Primary Examiner* — Anh Nguyen
(74) *Attorney, Agent, or Firm* — Schwegman Lundberg & Woessner, P.A.

(57) ABSTRACT

A system and method for detecting anomalies in a data stream is described. The system receives the data stream that comprises values of metrics derived from observations of operation of a computing entity over a time window. A model comprising variances of the data over the time window is formed. The model identifies operating thresholds for each metric based on the variances of the data for each metric in the data stream. The system computes a steady state distance matrix of the data stream. The system determines that the steady state distance matrix exceeds a steady state threshold. In response to determining that the steady state distance matrix exceeds the steady state threshold, the system computes a pattern distance matrix based on the steady state distance matrix. The anomaly in the data stream is detected based on the pattern distance matrix. The system generates an alert indicating the anomaly.

19 Claims, 6 Drawing Sheets

(51) Int. Cl.
  *H04L 41/0631* (2022.01)
  *H04L 43/16* (2022.01)
  *H04L 43/08* (2022.01)
(58) Field of Classification Search
  CPC ............ G06F 2201/81; G06F 11/3006; G06F 11/3409; G06F 11/3447; G06F 11/3452; G06F 21/566; G06F 21/552
  See application file for complete search history.

(56) References Cited

U.S. PATENT DOCUMENTS

| | | | |
|---|---|---|---|
| 10,140,576 | B2 | 11/2018 | Eldardiry et al. |
| 10,187,326 | B1 | 1/2019 | Anand et al. |
| 2006/0101402 | A1 | 5/2006 | Miller et al. |
| 2017/0339168 | A1* | 11/2017 | Balabine ............... G06F 16/951 |
| 2019/0081876 | A1* | 3/2019 | Ghare ................. H04L 63/1425 |
| 2019/0102276 | A1* | 4/2019 | Dang ................ G06F 18/24155 |
| 2019/0294524 | A1* | 9/2019 | Gupta ................... G06F 11/364 |
| 2020/0211325 | A1* | 7/2020 | Kaizerman ......... G06F 16/2477 |

OTHER PUBLICATIONS

Communication under rule 71(3) received for European Application No. 21766354.1, mailed on Aug. 23, 2024, 8 pages.

"Hamming Distance", Retrieved From: https://web.archive.org/web/20200718145929/https:/en.wikipedia.org/wiki/Hamming_distance, Jul. 18, 2020, 6 Pages.

"Predictive Analytics Fueled by AI & ML", Retrieved From: https://web.archive.org/web/20200513230955/https:/resolve.io/aiops/predictive-analytics, May 13, 2020, 10 Pages.

Cerliani, Marco, "Anomaly Detection in Multivariate Time Series with VAR", Retrieved From: https://towardsdatascience.com/anomaly-detection-in-multivariate-time-series-with-var-2130f276e5e9, Jun. 17, 2020, 9 Pages.

"Search Report Issued in Luxembourg Patent Application No. LU102090", Mailed Date: May 17, 2021, 10 Pages.

Maya, et al., "dLSTM: A New Approach for Anomaly Detection using Deep Learning with Delayed Prediction", In International Journal of Data Science and Analytics, vol. 8, May 15, 2019, pp. 137-164.

"International Search Report & Written Opinion Issued in PCT Application No. PCT/US21/046577", Mailed Date: Oct. 8, 2021, 15 Pages.

Frank, Adam, "Extracting Insights from Metrics with AIOps for Better Observability", Retrieved From: https://web.archive.org/web/20200621002014/https://www.moogsoft.com/blog/aiops/better-observability/, Apr. 20, 2020, 16 Pages.

Decision to Grant pursuant to Article 97(1) received for European Application No. 21766354.1, mailed on Nov. 21, 2024, 02 pages.

\* cited by examiner

ANOMALOUS PATTERN DETECTION FOR CONTROL OF COMPUTER NETWORKS

CLAIM OF PRIORITY

This application is a U.S. National Stage Filing under 35 U.S.C. 371 of International Patent Application Serial No. PCT/US2021/046577, filed Aug. 18, 2021, and published as WO 2022/072078 A1 on Apr. 7, 2022, which application claims the benefit of priority to Luxembourg Patent Application No. LU102090, filed Sep. 29, 2020, which applications and publication are incorporated herein by reference in their entirety.

TECHNICAL FIELD

The subject matter disclosed herein generally relates to detecting an anomalous pattern in multivariate time series metrics of a computer network or computer system to facilitate management and control of the computer network or computer system.

BACKGROUND

Management and control of computer networks is difficult to achieve efficiently and with flexibility. A similar problem arises in management and control of data centers. Often metrics are monitored and are available, but it is difficult to use those metrics to effectively manage and control the computer network, data centre or other computing entity. Analyzing metrics related to an operation of a computer application can be difficult to achieve given the millions of data point entries and the lack of context of computed metrics. Furthermore, the effectiveness and accuracy of human-driven analysis of large sets of data is increasingly low compared to machine-driven analysis. For example, if an organization needs a time sensitive analysis of a data set that has millions of entries across hundreds of variables, no human could perform such an analysis by hand or mentally. Furthermore, any such analysis may be out-of-date almost immediately, should an update be required.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
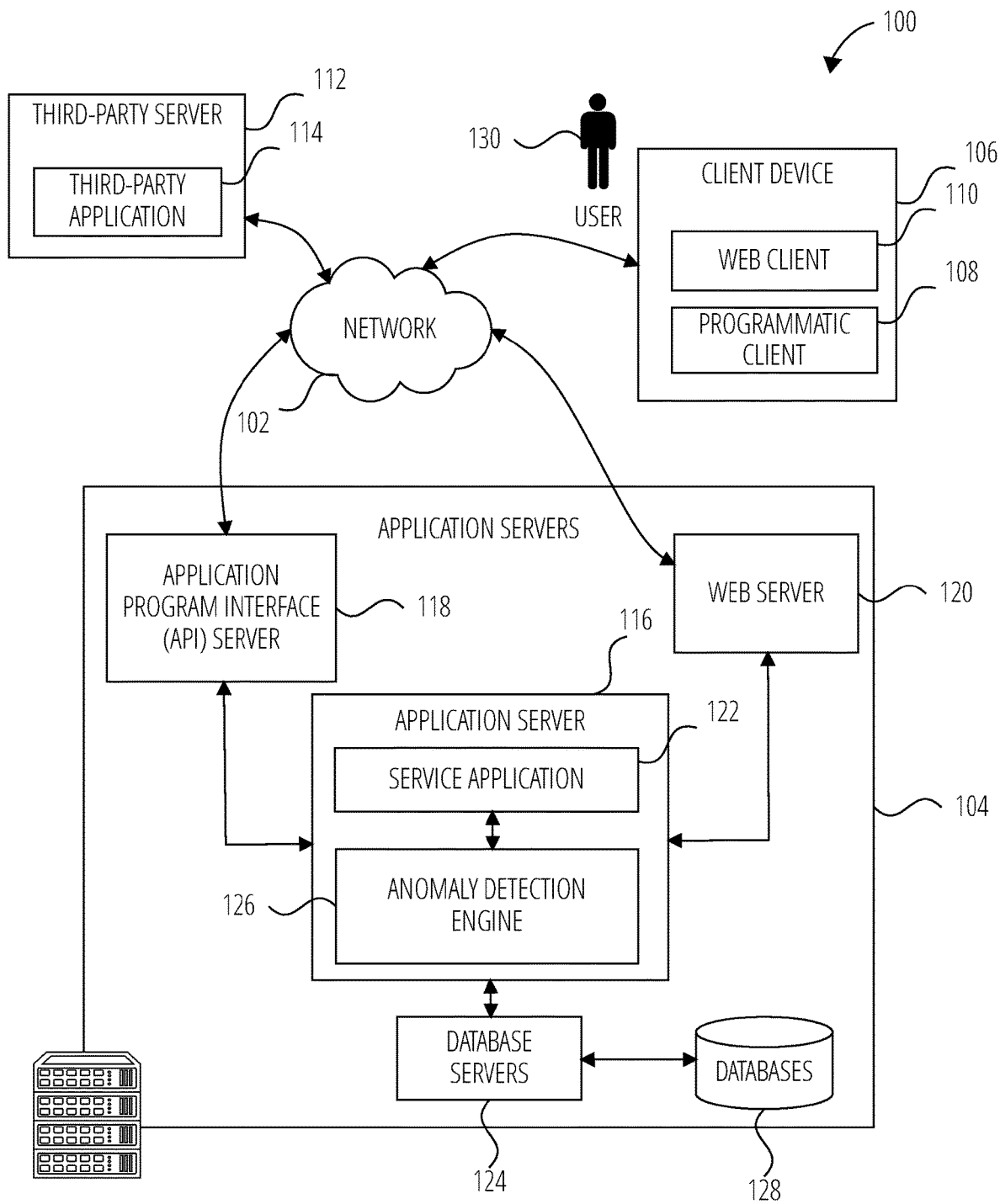
FIG. 1 is a diagrammatic representation of a networked environment in which the present disclosure may be deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The term "metric vectors" is used herein to refer to the value of a metric measured at equidistant time intervals.

The term "operating thresholds" is used herein to refer to a range of values that a metric measure under "normal" operating conditions. The "normal" operating conditions may be defined by a user or may be based on a statistical analysis of the metric data.

The term "anomalous point" is used herein to refer to a metric value that lies outside the operating thresholds.

The term "steady state" is used herein to refer to a metric vector that is under operating thresholds.

The term "anomalous state" is used herein to refer to metric vectors that contain anomalous points that need alerting.

The term "pattern matrix" is used herein to refer to anomalous states of metric vector(s) that needs alerting.

The present application describes a method for detecting anomalous patterns of multivariate time series metrics measured from a computing entity such as an individual computing device, a network of computing devices, a data centre or other computing entity. As the number of data points increase, the need for efficiently analyzing the data becomes increasingly important, both in order to be able to obtain tractable results and in order to be able to use the results to control or manage the computing entity in a practical manner. In particular, the present application describes a method for discriminating anomalous patterns of multivariable time series metrics from non-anomalous patterns of multivariable time series metrics by first generating a model that identifies operating thresholds and second detecting anomalous patterns based on a "steady state distance" of an anomalous pattern matrix derived from the model. By using patterns as opposed to individual statistics robustness is achieved since with individual statistics anomalies are more likely to be identified in error due to natural outliers of a metric, as opposed to the situation where a pattern is detected. Once an anomalous pattern is discriminated information about the anomalous pattern is useable to manage and control the computing entity such as by taking action to adjust load balancing between components of the computing entity, by shutting down or disabling one or more components of the computing entity such as where the anomaly indicates a security breach, by triggering an automated maintenance operation on one or more components of the computing entity, or in other ways.

In one example embodiment, a system for detecting anomalies in a data stream is described. The system receives data stream that comprises values of metrics derived from observations of operation of a computing entity over a time window. The system forms a model comprising variances of the data over the time window. The model identifies operating thresholds for each metric based on the variances of the data for each metric in the data stream. The system uses the model to compute a steady state distance matrix of the data stream. The system determines that the steady state distance matrix exceeds a steady state threshold that is determined based on the operating thresholds of the model and metric vectors of the incoming data stream. In response to determining that the steady state distance matrix exceeds the steady state threshold, the system computes a pattern distance matrix based on the steady state distance matrix. The system detects an anomaly in the data stream based on the pattern distance matrix, and generating an alert indicating the anomaly.

Since the steady state distance matrix is efficient to compute for the data stream it provides an extremely scalable and effective way of analyzing the data stream. The steady state distance matrix can be thought of as carrying out a high-level analysis. When the steady state distance matrix exceeds a steady state threshold as described above, a more detailed analysis is done using the pattern distance matrix. The pattern distance matrix gives an extremely accurate and robust result as it uses a pattern rather than an individual statistic. Thus, by using the combination of a steady state distance matrix and a pattern distance matrix it is possible to achieve accuracy and scalability. As a result, control of the computing entity from which the metrics are observed or measured or derived is possible in a practical manner. The control is achieved in real-time in some embodiments.

As a result, one or more of the methodologies described herein facilitate solving the technical problem of facilitating control of a computing entity to save resources and/or improve performance. In an example the computing entity is a data center comprising one or more application servers as illustrated in FIG. 1. By efficient, accurate detection of anomalies in metrics observed from the data centre it is possible to adjust, manage or control the data centre in real time. In an example where the data centre comprises application servers which provide a cloud service to client devices, an end user has improved performance of the application and optimized user operations of the application. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed. One or more application servers 104 provide server-side functionality via a network 102 to a networked user device, in the form of a client device 106. A user 130 operates the client device 106. The client device 106 includes a web client 110 (e.g., a browser), a programmatic client 108 (e.g., an email/calendar application such as Microsoft Outlook™, an instant message application, a document writing application, a shared document storage application) that is hosted and executed on the client device 106.

An Application Program Interface (API) server 118 and a web server 120 provide respective programmatic and web interfaces to application servers 104. A specific application server 116 hosts the service application 122 and an anomaly detection engine 126. The service application 122 and the anomaly detection engine 126 each include components, modules and/or applications.

The service application 122 includes a server side email/calendar enterprise application, a server side instant message enterprise application, a document authoring enterprise application, or a shared document storage enterprise application. The service application 122 enables users of an enterprise to collaborate and share document, messages, and other data (e.g., meeting information, common projects) with each other. For example, the user 130 at the client device 106 accesses and uses the service application 122 to edit documents that are shared with other users of the same enterprise. In another example, the client device 106 accesses and uses the service application 122 to retrieve or send messages or emails to and from other peer users of the enterprise. Other examples of service application 122 includes enterprise systems, content management systems, and knowledge management systems.

In one example embodiment, the anomaly detection engine 126 communicates with the service application 122 and accesses metrics related to the user operation data of the service application 122. The user operation data includes data points that measure the frequency, dates, times of users operating the enterprise application, types of documents being accessed or shared by users of the enterprise application, users calendar data from the enterprise application, communication data between users of the enterprise application, and enterprise organization data (e.g., hierarchy of users within an enterprise).

In another example embodiment, the anomaly detection engine 126 communicates with the programmatic client 108 and accesses operation data (or interaction data with other users of the enterprise) from the user 130 with the programmatic client 108 or web client 110. In one example, the web client 110 communicates with the anomaly detection engine 126 and service application 122 via the programmatic interface provided by the Application Program Interface (API) server 118.

The anomaly detection engine 126 determines time-series metrics (e.g., metrics with variables that change over time) based on operation data of the service application 122 and interaction data between users of the enterprise. The operation data and interaction data is collected by a combination of the service application 122, the web client 110, or the programmatic client 108. Examples of metrics include operation metrics that are associated with an enterprise or a group of user accounts within the enterprise. In one example, the anomaly detection engine 126 measures operation metrics based on operation data of the service application 122 by a group of user accounts of the enterprise. In another example, the anomaly detection engine 126 measures interaction metrics based on interaction data of the group of user accounts using the service application 122. In another example, the anomaly detection engine 126 measures operation metrics based on other filter criteria (group department, group size, group hierarchy-managers, supervisors, team leader, user physical location, office location, time, seasonality).

In one example embodiment, the anomaly detection engine 126 detects anomalous patterns based on the metrics and generates an alert to the service application 122 or the client device 106. The alert indicates an anomalous activity as indicated by the pattern of the metrics. In another example, the alert indicates that the metrics corresponding to a predefined anomalous pattern (e.g., anomalous pattern X detected). The system uses the alert as a feedback mechanism in adjusting the operating thresholds of the model (e.g., increase or decrease upper/lower thresholds based on identified anomalous pattern).

In another example embodiment, the anomaly detection engine 126 provides a (user-interactive) portion of a GUI that identifies the anomalous activity and prompt modifications to settings or operations of the service application 122 or the client device 106. For example, the anomaly detection engine 126 generates a configuration setting (e.g., disable operation of service application 122 during user-defined period of times) for the service application 122 based on the operation/interaction metrics. The anomaly detection engine 126 applies the configuration setting to the service application 122. As such, the service application 122 that is modified by the configuration setting now operates in a different manner (e.g., generating more frequent or less different alerts, modifying a setting of a communication application to automatically generate alert that indicate a particular pattern, setting a limit to the number of users of the service application 122).

Examples of configuration settings include changes to how the service application 122 operates at different times. For example, the service application 122 may be configured to be disabled during a preset amount of time during the day. In another example, the service application 122 may be configured to generate and display only certain types of alert. In another example, the service application 122 may be configured to generate a dialog box pre-populated with information based on the recommended action (e.g., pre-filled with parameters of a feature of the service application 122). The user 130 only has to click on one button to configure the anomaly detection engine 126 with the new parameters. For example, the pre-filled parameters configure the model generation of the anomaly detection engine 126 to exclude certain metrics. Such configuration results in an efficient operation of the anomaly detection engine 126 to further identify relevant anomalous states from the metrics.

In one example embodiment, the anomaly detection engine 126 automatically calculates the operating thresholds of metric vectors and generates a model based on the operating threshold for each metric. The anomaly detection engine 126 uses the model to detect an anomalous state for an incoming data stream (e.g., time-series metrics). The anomaly detection engine 126 determines anomalous points and calculates a steady state distance. If the steady state distance exceeds a threshold, the anomaly detection engine 126 then calculates a pattern similarity distance. Example components and operations of the anomaly detection engine 126 are further described below with respect to FIG. 2 and FIG. 3.

The application server 116 is shown to be communicatively coupled to database servers 124 that facilitates access to an information storage repository or databases 128. In an example embodiment, the databases 128 includes storage devices that store information to be processed by the service application 122 and the anomaly detection engine 126.

Additionally, a third-party application 114 may, for example, store another part of the service application 122, or include a cloud storage system. For example, the third-party application 114 stores additional metrics. The third-party application 114 executing on a third-party server 112, is shown as having programmatic access to the application server 116 via the programmatic interface provided by the Application Program Interface (API) server 118. For example, the third-party application 114, using information retrieved from the application server 116, may supports one or more features or functions on a website hosted by the third party.

Figure 2:
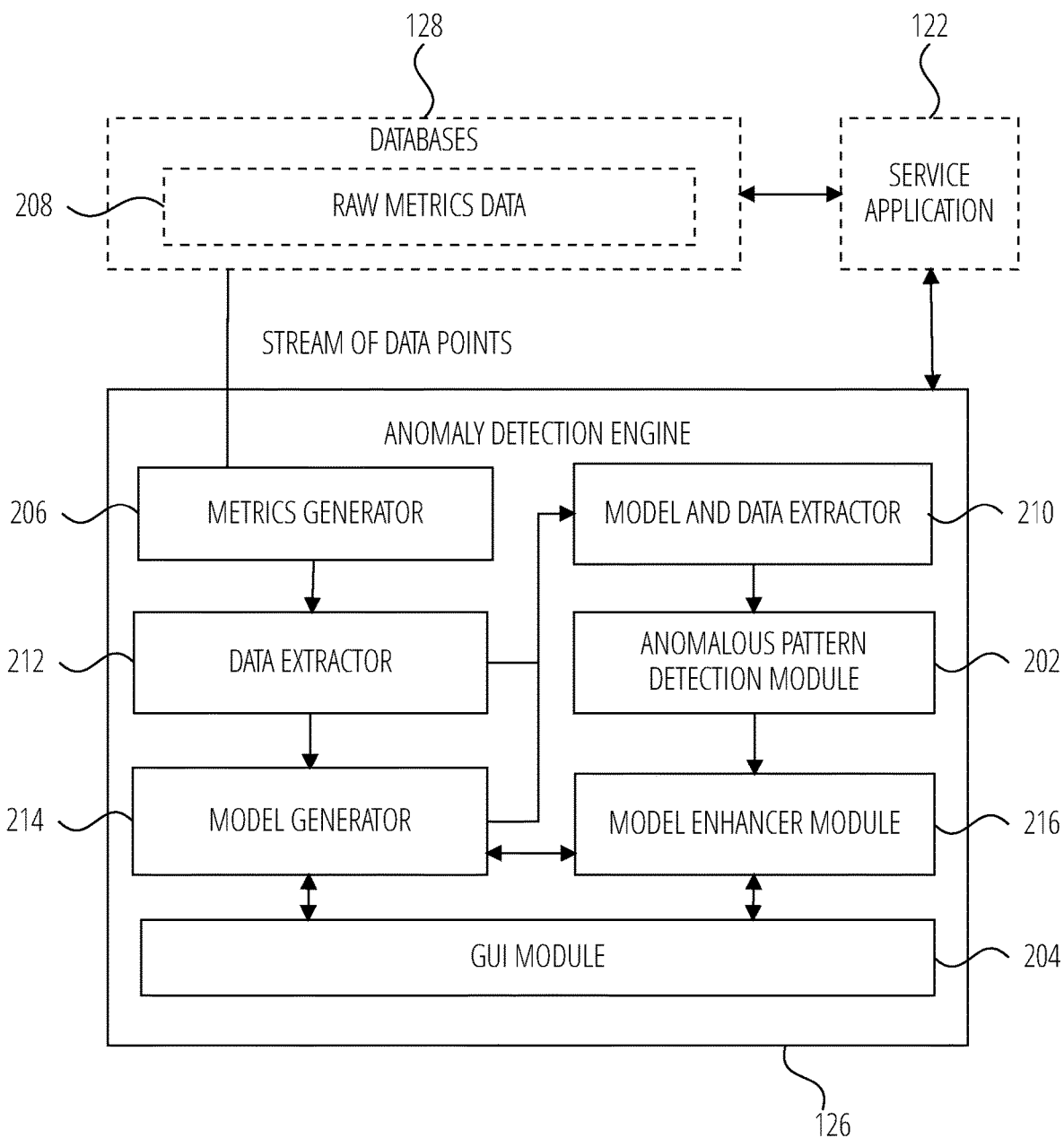
FIG. 2 is a block diagram illustrating an anomaly detection engine in accordance with one example embodiment.

FIG. 2 is a block diagram illustrating the anomaly detection engine 126 in accordance with one example embodiment. The anomaly detection engine 126 includes a metrics generator 206, a data extractor 212, a model generator 214, a model and data extractor 210, an anomalous pattern detection module 202, and a model enhancer module 216, and a GUI module 204.

The metrics generator 206 communicates with client devices of the service application 122. In one example embodiment, the metrics generator 206 implements queries to access raw metrics data 208 from the databases 128. In one example, the raw metrics data 208 include a data stream points (e.g., operation of the 122, user operation/interaction data from devices with access to the service application 122). The user operation data indicate user activities with the service application 122 (e.g., when and how often the user is using the service application 122). The user interaction data indicate interactions (e.g., types, frequency, dates, recipient's identification) between users of the service application 122.

In another example embodiment, other data points include user activities associated with other applications. Other examples of data points include frequency, dates, times of users operating the enterprise application, types of documents being accessed or shared by users of the enterprise application, users calendar data from the enterprise application, communication data between users of the enterprise application, and enterprise organization data. Examples of other applications include email applications, document editing applications, document sharing applications, and other types of applications used by enterprises.

The metrics generator 206 determines metrics vector based on the data points (e.g., operation/interaction data of the service application 122) over a window of time. In one example embodiment, the metric vector measures a metric at equidistant time intervals over the window of time. Examples of metrics vectors include communication metrics vectors, collaboration metrics vectors, operation metrics vectors.

The data extractor 212 extracts metrics data from the metrics generator 206. In another example, the data extractor 212 retrieves the metrics vector data from the metrics generator 206. In yet another example, the data extractor 212 computes the metrics vector based on the metrics data extracted from the metrics generator 206.

The following represents an example of a metric vector (as a function of time):

TransactionVolume$_n$=f(t)
TransactionFailureRate$_n$=f(t)
X$_n$=f(t)

In another example, the data extractor 212 extracts metrics vector data for the identified metric vector in such a way that seasonality is captured. For example, if the number of operation of the service application 122 ramps up during a first quarter, peaks during second and third quarters and dips during the fourth quarter, a year's worth of metrics data may be desired to produce an effective model. These models would be refreshed based on the periodicity of usage of the service application 122.

Frequency of metrics data collection depends on the desire for precision. For example, the alert is to be generated based on the changes to the usage of the service application 122 between hours, then a 24 hour sample of metrics data per day would be sufficient.

The model generator 214 forms a model that captures all operating thresholds based on the metrics data. In one example embodiment, the model generator 214 determines operating thresholds for each metric by calculating a second order differential of the metric vector.

These operating thresholds are stored as a part of the model. Because these metric vectors can be represented as time series, generating operating thresholds for lowest level of periodicity improves the performance of detections. For example, if the number of accesses to the service application 122 stays higher on weekdays than the accesses placed during weekends, the model generator 214 capture operating thresholds for weekday and weekends separately.

The following represents an example of rates of change of metric vectors by obtaining their differentials and second order differential is used to characterize the metric vector:

$$RatesOfChange(X_n) = \frac{d^2(f(X))}{d(t)^2}$$

As such, the acceleration vector can be decomposed into 3 vectors:

$X_1t$ where $\mu(X_1t) \to 0$, where range X1t defines pass band constants.

$X_2t$ where $\mu(X_2t) \to \infty$, where range X2t defines the high pass filter constants.

$X_3t$ where $\mu(X_3t) \to \infty$, wherein range X3t defines the low pass filter constants.

Ranges of X2t and X3t define the higher and lower bounds of the threshold where the variable is anomalous.

These operating thresholds are stored as a part of the model. As these metric vectors can be represented as time series, generating operating thresholds for lowest level of periodicity improves the performance of detections. For example, If the number of calls placed for a customer stays higher than the calls placed during weekends, it would be advised to capture operating thresholds for weekday and weekends separately.

The model and data extractor 210 combines metric data (of an incoming data stream) with the model from the model generator 214 to enable filtering.

The anomalous pattern detection module 202 detects whether the metric data matches (or is close to) an anomalous pattern. In one example, the anomalous pattern detection module 202 generates an alert indicating the anomalous state and feedback loop to the model generator 214 to revise the operating thresholds. The components and operation of the anomalous pattern detection module 202 is described in more detail below with respect to FIG. 3.

The model enhancer module 216 learns new filter constants based on the output from a signal filter applied to the output of the model and data extractor 210. The signal filter may be a combination of high pass, low pass, and stop band filters.

The GUI module 204 generates a GUI that indicates the metrics vectors and the alert. For example, the GUI module 204 causes a notification of the alert indicating an anomalous pattern. The GUI module 204 further provides an interactive pane for a user of the anomaly detection engine 126 to adjust a configuration/operation setting of the service application 122. The settings may be provided by the model enhancer module 216. For example, the settings may be for disabling a feature of the service application 122 during specific times.

Figure 3:
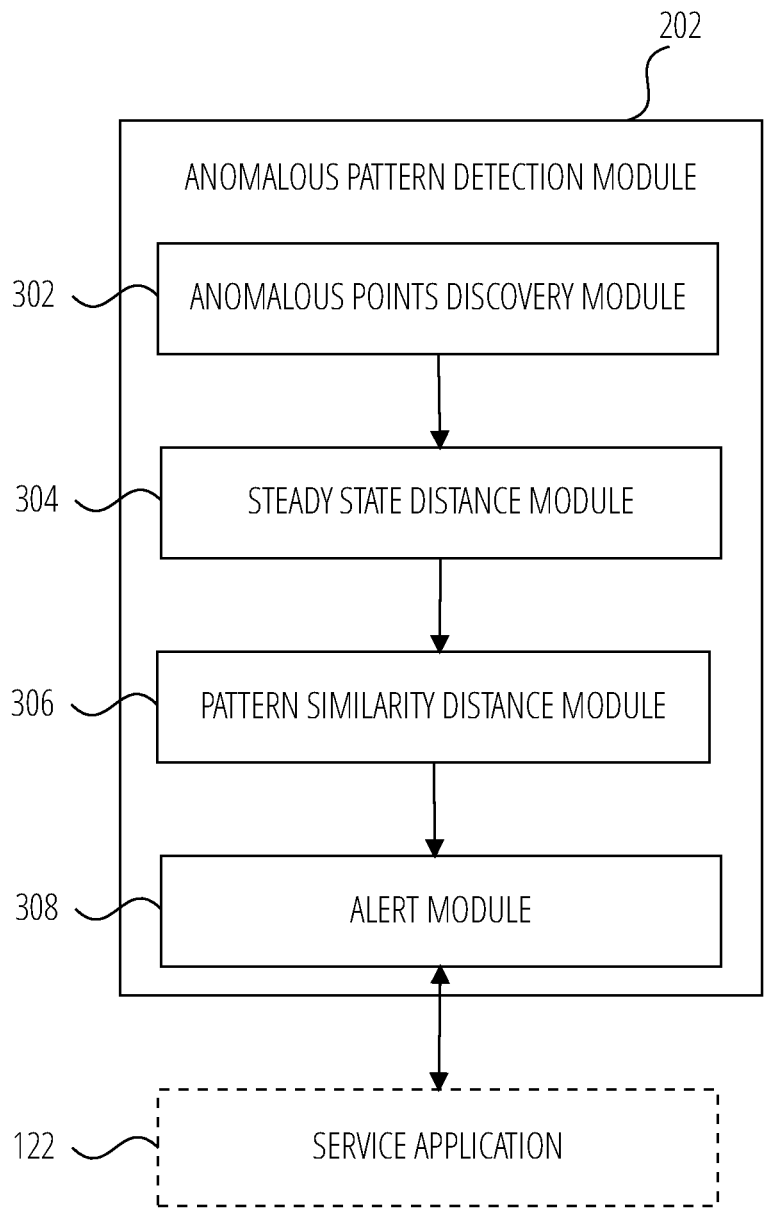
FIG. 3 is a block diagram illustrating an anomalous pattern detection module in accordance with one example embodiment.

FIG. 3 is a block diagram illustrating an anomalous pattern detection module 202 in accordance with one example embodiment. The anomalous pattern detection module 202 includes an anomalous points discovery module 302, a steady state distance module 304, a pattern similarity distance module 306, and an alert module 308.

The anomalous points discovery module 302 determines anomalous points in the metric vector data from the data extractor 212. For example, the anomalous points discovery module 302 compares each point on the metric vector against the operating thresholds of the metric. The anomalous points discovery module 302 assigns a "zero" point where the value of the metric vector is within the operating thresholds, and a "one" point wherein the value of the metric vector is outside the operating thresholds. This step is repeated for all the identified metric vectors to produce a matrix, also referred to as an anomalous pattern matrix.

The following illustrates an example anomalous pattern matrix that represents n contiguous samples of a metric X:

$$X_n = \begin{bmatrix} x_1 \\ x_2 \\ . \\ x_n \end{bmatrix} \text{ where } x_i \in 0, 1$$

Similarly, m metrics can be represented as follows:

$$X_{m,n} = \begin{bmatrix} a_{1,1} & b_{1,2} & \ldots & a_{1,n} \\ a_{2,1} & b_{2,2} & \ldots & n_{2,n} \\ \ldots & \ldots & \ldots & \ldots \\ a_{m,1} & a_{m,2} & \ldots & n_{m,n} \end{bmatrix} \text{ where } xi, j \in 0, 1$$

The steady state distance module 304 accesses the anomalous pattern matrix generated at anomalous points discovery module 302 and computes a Hamming distance from a steady state. The Hamming distance refers an algorithm named after the mathematician Richard Hamming. In information theory, the Hamming distance between two strings of equal length is the number of positions at which the corresponding symbols are different. In other words, it measures the minimum number of substitutions required to change one string into the other, or the minimum number of errors that could have transformed one string into the other. In a more general context, the Hamming distance is one of several string metrics for measuring the edit distance between two sequences. In another example embodiment, other algorithms can be used to measure a distance/similarity between two sequences/matrices.

If the Hamming distance is greater than a given threshold (that is calculated by the pattern matrix), the process moves on to the pattern similarity distance module 306.

The steady state (also referred to as non-anomalous state) can be represented as a null matrix of order m*n as follows:

$$0 = \begin{bmatrix} 0 & 0 & \ldots & 0 \\ 0 & 0 & \ldots & 0 \\ \ldots & \ldots & \ldots & \ldots \\ 0 & 0 & \ldots & 0 \end{bmatrix}$$

The metric value ranges between 0 and 1 and indicates a score of how anomalous a state is. The hamming distance of the anomalous pattern matrix from the steady state (also referred to as steady state distance) can be represented as follows:

$$SteadyStateDistance = \frac{(X_{m,n} - 0_{m,n})}{m*n}$$

The pattern similarity distance module 306 calculates a pattern similarity distance in response to the steady state distance exceeding a predefined threshold (e.g., 0.5). The pattern similarity distance module 306 accesses the anomalous pattern matrix from the anomalous points discovery module 302 and computes the Hamming distance between the anomalous pattern matrix (or other predefined anomalous pattern matrices) and the metric matrix (from incoming data stream).

The alert module 308 generates an alert to the service application 122 if the Hamming distance between the metric matrix is close to the anomalous pattern matrix (or to any of predefined anomalous pattern matrices).

Figure 4:
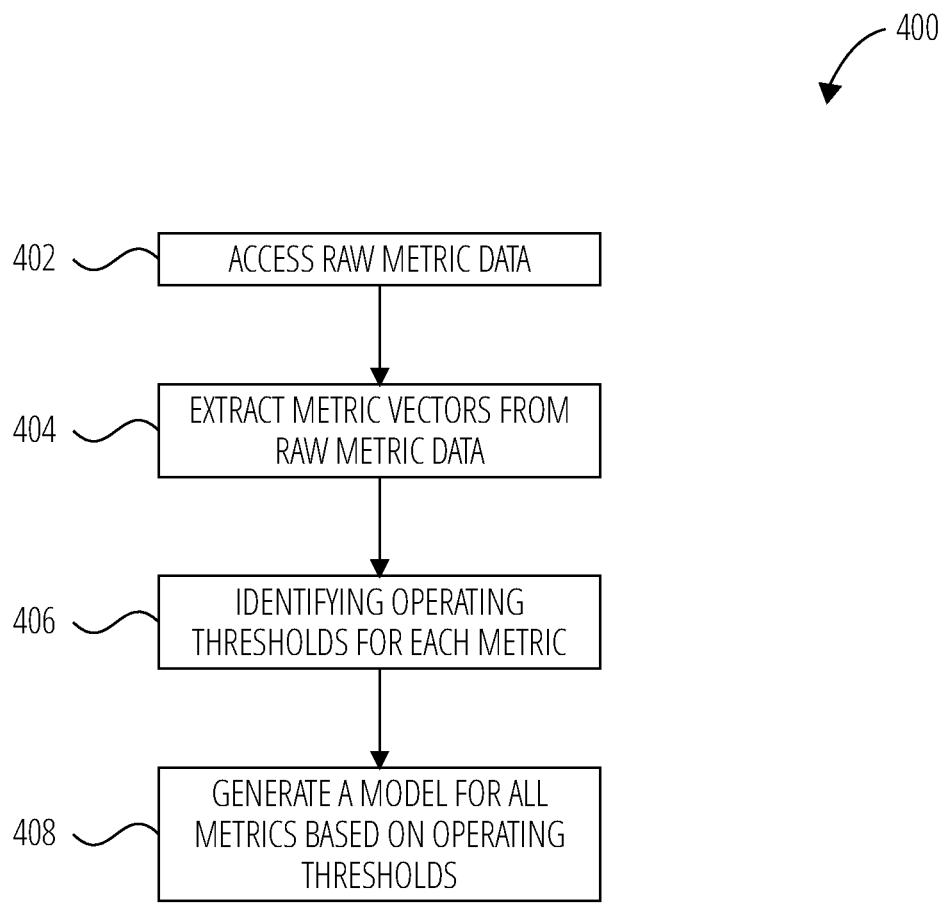
FIG. 4 is a flow diagram illustrating a method for generating a model in accordance with one example embodiment.

FIG. 4 is a flow diagram illustrating a method for generating a model in accordance with one example embodiment. Operations in the method 400 may be performed by the anomaly detection engine 126, using components (e.g., modules, engines) described above with respect to FIG. 2 and FIG. 3. Accordingly, the method 400 is described by way of example with reference to the anomaly detection engine 126. However, it shall be appreciated that at least some of the operations of the method 400 may be deployed on various other hardware configurations or be performed by similar components residing elsewhere. For example, some of the operations may be performed at the client device 106 or at the third-party server 112.

At block 402, the metrics generator 206 accesses raw metrics data 208 (e.g., time-series data) from the databases 128 or from the service application 122. At block 404, the data extractor 212 extracts metric vectors from the raw metrics data 208. At block 406, the model generator 214 identifies operating thresholds for each metric. For example, the model generator 214 identifies an upper threshold and a lower threshold for a metric. The region between the lower and upper threshold indicates a non-anomalous region. At block 408, the model generator 214 generates a model each metric based on the corresponding operating thresholds.

Figure 5:
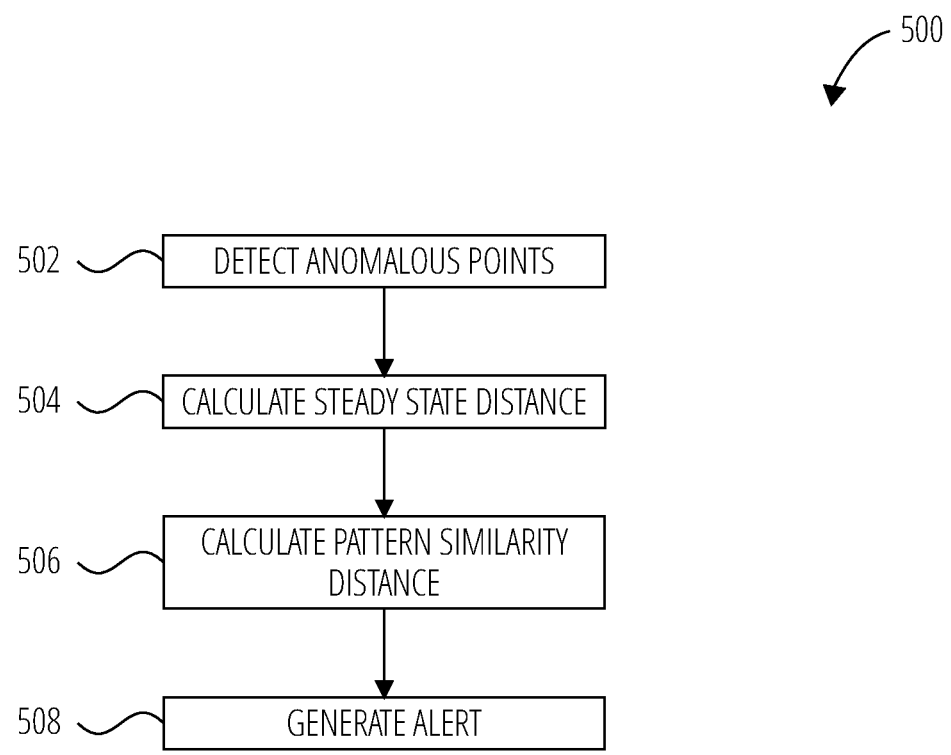
FIG. 5 is a flow diagram illustrating a method for calculating a pattern similarity distance in accordance with one example embodiment.

FIG. 5 is a flow diagram illustrating a method 500 for calculating a pattern similarity distance in accordance with one example embodiment. Operations in the method 500 may be performed by the anomaly detection engine 126, using components (e.g., modules, engines) described above with respect to FIG. 2 and FIG. 3. Accordingly, the method 500 is described by way of example with reference to the anomaly detection engine 126. However, it shall be appreciated that at least some of the operations of the method 500 may be deployed on various other hardware configurations or be performed by similar components residing elsewhere. For example, some of the operations may be performed at the client device 106 or at the third-party server 112.

At block 502, the anomalous points discovery module 302 detect anomalous points in the raw metrics data 208 by forming an anomalous pattern matrix based on the raw metrics data 208 as described above. At block 504, the steady state distance module 304 calculates a steady state distance (based on Hamming distance algorithm) of the anomalous pattern matrix relative to a steady state matrix (e.g., a non-anomalous matrix). If the steady state distance exceeds a threshold, the process moves to block 506. At block 506, the pattern similarity distance module 306 calculates a pattern similarity distance between a metric matrix from an incoming data stream (e.g., new metric data) and a predefined anomalous pattern (e.g., anomalous pattern matrix X, anomalous pattern matrix Y) to identify which predefined anomalous pattern the metric matrix is closest to. For example, the pattern similarity distance module 306 determines that the metric matrix matches anomalous pattern matrix X. In response to the matching, the alert module 308 generates an alert at block 508.

Figure 6:
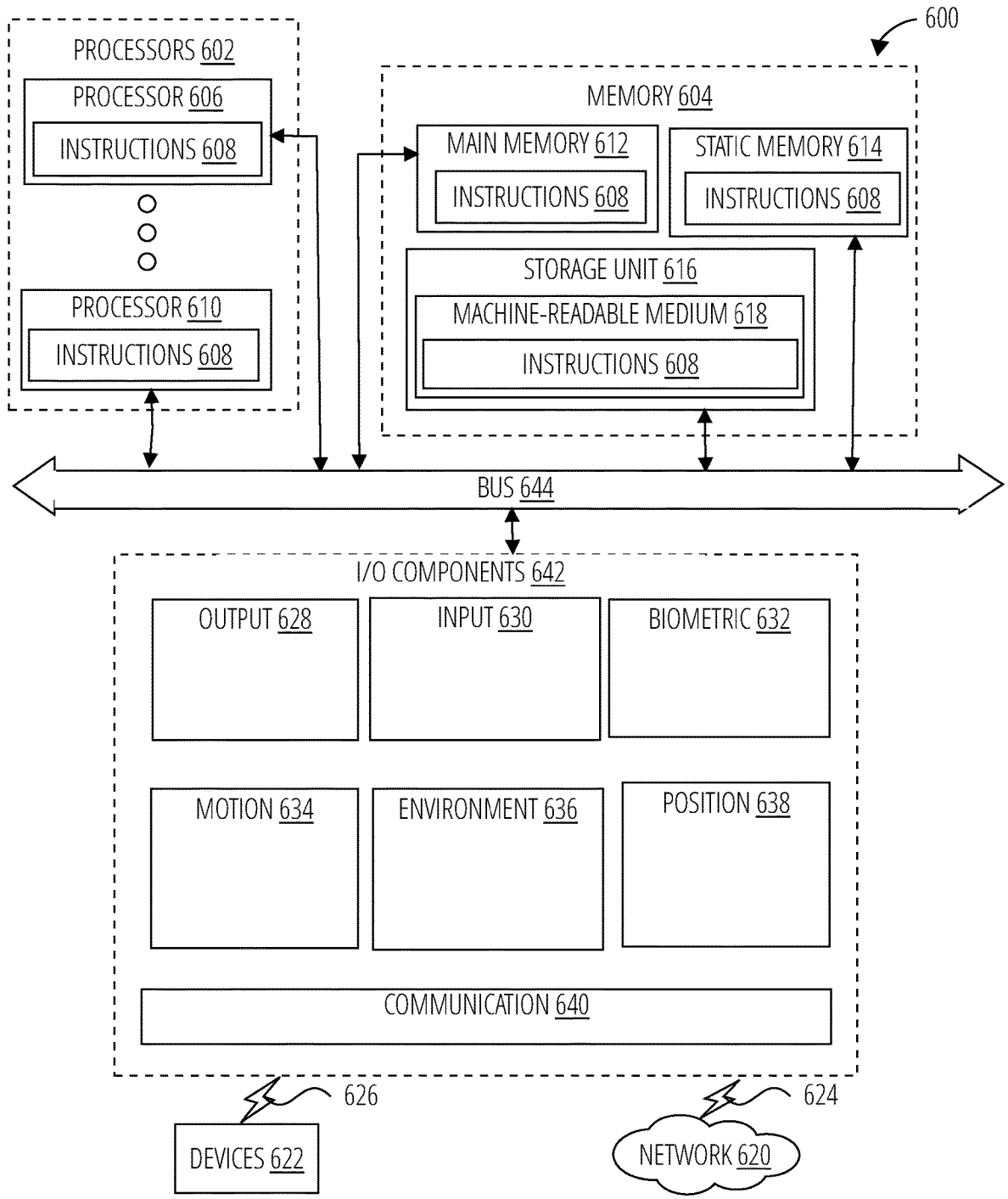
FIG. 6 is a diagrammatic representation of a machine in the form of a computer system within which a set of instructions may be executed for causing the machine to perform any one or more of the methodologies discussed herein, according to an example embodiment.

FIG. 6 is a diagrammatic representation of the machine 600 within which instructions 608 (e.g., software, a program, an application, an applet, an app, or other executable code) for causing the machine 600 to perform any one or more of the methodologies discussed herein may be executed. For example, the instructions 608 may cause the machine 600 to execute any one or more of the methods described herein. The instructions 608 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 608, sequentially or otherwise, that specify actions to be taken by the machine 600. Further, while only a single machine 600 is illustrated, the term "machine" shall also be taken to include a collection of machines that individually or jointly execute the instructions 608 to perform any one or more of the methodologies discussed herein.

The machine 600 may include processors 602, memory 604, and I/O components 642, which may be configured to communicate with each other via a bus 644. In an example embodiment, the processors 602 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 606 and a Processor 610 that execute the instructions 608. The term "Processor" is intended to include multi-core processors that may comprise two or more independent processors (sometimes referred to as "cores") that may execute instructions contemporaneously. Although FIG. 6 shows multiple processors 602, the machine 600 may include a single Processor with a single core, a single Processor with multiple cores (e.g., a multi-core Processor), multiple processors with a single core, multiple processors with multiples cores, or any combination thereof.

The memory 604 includes a main memory 612, a static memory 614, and a storage unit 616, both accessible to the processors 602 via the bus 644. The main memory 604, the static memory 614, and storage unit 616 store the instructions 608 embodying any one or more of the methodologies or functions described herein. The instructions 608 may also reside, completely or partially, within the main memory 612, within the static memory 614, within machine-readable medium 618 within the storage unit 616, within at least one of the processors 602 (e.g., within the Processor's cache memory), or any suitable combination thereof, during execution thereof by the machine 600.

The I/O components 642 may include a wide variety of components to receive input, provide output, produce output, transmit information, exchange information, capture measurements, and so on. The specific I/O components 642 that are included in a particular machine will depend on the type of machine. For example, portable machines such as mobile phones may include a touch input device or other such input mechanisms, while a headless server machine will likely not include such a touch input device. It will be appreciated that the I/O components 642 may include many other components that are not shown in FIG. 6. In various example embodiments, the I/O components 642 may include output components 628 and input components 630. The output components 628 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 630 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 642 may include biometric components 632, motion components 634, environmental components 636, or position components 638, among a wide array of other components. For example, the biometric components 632 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 634 include acceleration sensor components (e.g., accelerometer), gravitation sensor components, rotation sensor components (e.g., gyroscope), and so forth. The environmental components 636 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 638 include location sensor components (e.g., a GPS receiver Component), altitude sensor components (e.g., altimeters or barometers that detect air pressure from which altitude may be derived), orientation sensor components (e.g., magnetometers), and the like.

Communication may be implemented using a wide variety of technologies. The I/O components 642 further include communication components 640 operable to couple the machine 600 to a network 620 or devices 622 via a coupling 624 and a coupling 626, respectively. For example, the communication components 640 may include a network interface Component or another suitable device to interface with the network 620. In further examples, the communication components 640 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 622 may be another machine or any of a wide variety of peripheral devices (e.g., a peripheral device coupled via a USB).

Moreover, the communication components 640 may detect identifiers or include components operable to detect identifiers. For example, the communication components 640 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 640, such as location via Internet Protocol (IP) geolocation, location via Wi-Fi® signal triangulation, location via detecting an NFC beacon signal that may indicate a particular location, and so forth.

The various memories (e.g., memory 604, main memory 612, static memory 614, and/or memory of the processors 602) and/or storage unit 616 may store one or more sets of instructions and data structures (e.g., software) embodying or used by any one or more of the methodologies or functions described herein. These instructions (e.g., the instructions 608), when executed by processors 602, cause various operations to implement the disclosed embodiments.

The instructions 608 may be transmitted or received over the network 620, using a transmission medium, via a network interface device (e.g., a network interface Component included in the communication components 640) and using any one of a number of well-known transfer protocols (e.g., hypertext transfer protocol (HTTP)). Similarly, the instructions 608 may be transmitted or received using a transmission medium via the coupling 626 (e.g., a peer-to-peer coupling) to the devices 622.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

EXAMPLES

Example 1 is a computer-implemented method for detecting anomalies in a data stream comprising: receiving the data stream that comprises values of metrics derived from observations of operation of a computing entity over a time window; forming a model comprising variances of the data over the time window, the model identifying operating thresholds for each metric based on the variances of the data for each metric in the data stream; using the model to compute a steady state distance matrix of the data stream; determining that the steady state distance matrix exceeds a steady state threshold that is determined based on the operating thresholds of the model and metric vectors of the incoming data stream; in response to determining that the steady state distance matrix exceeds the steady state threshold, computing a pattern distance matrix based on the steady state distance matrix; detecting an anomaly in the data stream based on the pattern distance matrix; and generating, at a computer, an alert indicating the anomaly.

Example 2 includes example 1, further comprising: identifying a rate of change of the values of each metric in the data stream over the time window; and determining a top operating threshold and a bottom operating threshold for each metric based on the rate of change of the values of each metric, a range formed between the bottom operating threshold and the top operation threshold for each metric indicative of a non-anomalous rate of change, wherein the operating thresholds for each metric comprise the top operating threshold and the bottom operating threshold for the corresponding metric.

Example 3 includes examples 1 or 2, further comprising: grouping values of a first metric from a first sub-window that comprises a shorter window of the time window based on a seasonality of the data stream; grouping values of the first metric from a second sub-window based on the seasonality of the data stream, the second sub-window being contiguous to the first sub-window; identifying a rate of change of values of the first metric in the first sub-window; computing first operating thresholds of the first metric in the first sub-window based on the rate of change of values of the first metric in the first sub-window; and identifying a rate of change of values of the first metric in the second sub-window; and computing second operating thresholds for the first metric in the second sub-window based on the rate of change of values of the first metric in the second sub-window.

Example 4 includes any preceding example, further comprising: forming an anomalous pattern matrix representative of anomalous events in the incoming data stream, wherein the steady state distance matrix is based on the anomalous pattern matrix.

Example 5 includes any preceding example, further comprising: accessing a value of a metric vector for each metric from the incoming data stream; comparing the value of the metric vector for each metric with operating thresholds of the corresponding metric; assigning a first matrix point value in response to the value of the metric vector being within the operating thresholds or a second matrix point value in response to the value of the metric vector being outside the operating thresholds; and forming an anomalous pattern matrix based on the first or second matrix point value of each metric from the incoming data stream.

Example 6 includes any preceding example, further comprising: calculating the steady state distance matrix between the anomalous pattern matrix and a steady state matrix, the steady state matrix representing a non-anomalous state; and calculating a steady state distance score for each metric based on the steady state distance matrix, the steady state distance score indicating a degree of anomaly, wherein the steady state threshold is based on the steady state distance score for each metric.

Example 7 includes any preceding example, further comprising: accessing a predefined pattern matrix indicative of an anomalous state; and computing a hamming distance matrix based on the anomalous pattern matrix and the predefined pattern matrix, wherein detecting the anomaly is based on the hamming distance matrix.

Example 8 includes any preceding example, further comprising: detecting a similarity between the anomalous pattern matrix and the predefined pattern matrix based on the hamming distance matrix; and in response to detecting the similarity, indicating in the alert that the anomaly corresponds to the anomalous state.

Example 9 includes any preceding example, further comprising: accessing a first predefined pattern matrix indicative of a first anomalous state; accessing a second predefined pattern matrix indicative of a second anomalous state; computing a first hamming distance matrix based on the anomalous pattern matrix and the first predefined pattern matrix; and computing a second hamming distance matrix based on the anomalous pattern matrix and the second predefined pattern matrix, wherein detecting the anomaly is based on the first hamming distance matrix and the second hamming distance matrix, wherein the alert indicate the first or second predefined pattern matrix in response to detecting the anomaly.

Example 10 includes any preceding example, further comprising: detecting a similarity between the anomalous pattern matrix and the first or second predefined pattern matrix based on the hamming distance matrix; and in response to detecting the similarity, indicating in the alert that the anomaly corresponds to the first or second anomalous state.

Example 11 includes any preceding example, further comprising: for each metric, forming a metric filter based on a high pass filter, a low pass filter, or a band filter; and adjusting the model based on the metric filter.

Example 12 includes any preceding example, further comprising: adjusting the operating thresholds of the model based on the anomaly identified in the alert.

Example 13 includes any preceding example, further comprising: adjusting the operating thresholds of the model based on the predefined pattern matrix identified in the alert.

Example 14 is a computer-readable storage medium, the computer-readable storage medium including instructions that when executed by a computer, cause the computer to perform operations implementing the method of any of example 1 to example 13.

Example 15 is a computing apparatus, the computing apparatus comprising: a processor; and a memory storing instructions that, when executed by the processor, configure the apparatus to perform operations for detecting anomalies in a data stream, the operations comprising: receiving the data stream that comprises values of metrics derived from observations of operation of a computing entity over a time window; forming a model comprising variances of the data over the time window, the model identifying operating thresholds for each metric based on the variances of the data for each metric in the data stream; using the model to compute a steady state distance matrix of the data stream; determining that the steady state distance matrix exceeds a steady state threshold that is determined based on the operating thresholds of the model and metric vectors of the incoming data stream; in response to determining that the steady state distance matrix exceeds the steady state threshold, computing a pattern distance matrix based on the steady state distance matrix; detecting an anomaly in the data stream based on the pattern distance matrix; and generating, at the computing apparatus, an alert indicating the anomaly.

What is claimed is:

1. A computer-implemented method for detecting anomalies in a data stream comprising:
    receiving the data stream that comprises values of metrics derived from observations of operation of a computing entity over a time window;
    forming a model comprising variances of data of the data stream over the time window, the model identifying operating thresholds for each metric based on the variances of the data for each metric in the data stream, wherein the variances are represented as acceleration matrices, and wherein bounds of the operating thresholds are determined using the acceleration matrices;
    accessing a value of a metric vector for each metric from the data stream;
    comparing the value of the metric vector for each metric with operating thresholds of a corresponding metric from the model, wherein an operating threshold for a first metric is calculated by computing first operating thresholds of the first metric in a first sub-window based on a rate of change of values of the first metric in the first sub-window and computing second operating thresholds for the first metric in a second sub-window based on a rate of change of values of the first metric in the second sub-window;
    assigning a first matrix point value in response to the value of the metric vector being within the operating thresholds or a second matrix point value in response to the value of the metric vector being outside the operating thresholds;
    forming an anomalous pattern matrix based on the first matrix point value or the second matrix point value of each metric from the data stream;
    using the model to compute a steady state distance matrix of the data stream, by calculating a steady state distance between the anomalous pattern matrix and a steady state matrix, the steady state matrix representing a non-anomalous state;
    determining that the steady state distance matrix exceeds a steady state threshold that is determined based on the operating thresholds of the model and metric vectors of the data stream;
    in response to determining that the steady state distance matrix exceeds the steady state threshold, computing a Hamming distance between the anomalous pattern matrix and a metric matrix of metric vectors from the data stream;
    detecting an anomaly in a subsequent time window of the data stream based on the Hamming distance; and
    generating, at a computer, an alert indicating the anomaly.

2. The computer-implemented method of claim 1, further comprising:
    identifying a rate of change of the values of each metric in the data stream over the time window; and
    determining a top operating threshold and a bottom operating threshold for each metric based on the rate of change of the values of each metric, a range formed between the bottom operating threshold and the top operating threshold for each metric indicative of a non-anomalous rate of change,
    wherein the operating thresholds for each metric comprise the top operating threshold and the bottom operating threshold for a corresponding metric.

3. The computer-implemented method of claim 1, further comprising:
    grouping values of the first metric from the first sub-window that comprises a shorter window of the time window based on a seasonality of the data stream;
    grouping values of the first metric from the second sub-window based on the seasonality of the data stream, the second sub-window being contiguous to the first sub-window;
    identifying the rate of change of values of the first metric in the first sub-window; and
    identifying the rate of change of values of the first metric in the second sub-window.

4. The computer-implemented method of claim 1, further comprising:
    forming the anomalous pattern matrix representative of anomalous events in the data stream,
    wherein the steady state distance matrix is based on the anomalous pattern matrix.

5. The computer-implemented method of claim 1, further comprising:
    calculating the steady state distance matrix between the anomalous pattern matrix and a steady state matrix, the steady state matrix representing a non-anomalous state; and
    calculating a steady state distance score for each metric based on the steady state distance matrix, the steady state distance score indicating a degree of anomaly, wherein the steady state threshold is based on the steady state distance score for each metric.

6. The computer-implemented method of claim 1, further comprising:
    accessing a predefined pattern matrix indicative of an anomalous state.

7. The computer-implemented method of claim 6, further comprising:
    detecting a similarity between the anomalous pattern matrix and the predefined pattern matrix based on the hamming distance; and in response to detecting the similarity, indicating in the alert that the anomaly corresponds to the anomalous state.

8. The computer-implemented method of claim 1, further comprising:
accessing a first predefined pattern matrix indicative of a first anomalous state;
accessing a second predefined pattern matrix indicative of a second anomalous state;
computing a first hamming distance matrix based on the anomalous pattern matrix and the first predefined pattern matrix; and
computing a second hamming distance matrix based on the anomalous pattern matrix and the second predefined pattern matrix,
wherein detecting the anomaly is based on the first hamming distance matrix and the second hamming distance matrix, wherein the alert indicates the first predefined pattern matrix or the second predefined pattern matrix in response to detecting the anomaly.

9. The computer-implemented method of claim 8, further comprising:
detecting a similarity between the anomalous pattern matrix and the first predefined pattern matrix or the second predefined pattern matrix based on the second hamming distance matrix; and
in response to detecting the similarity, indicating in the alert that the anomaly corresponds to the first anomalous state or the second anomalous state.

10. The computer-implemented method of claim 1, further comprising:
for each metric, forming a metric filter based on a high pass filter, a low pass filter, or a band filter; and
adjusting the model based on the metric filter.

11. The computer-implemented method of claim 1, further comprising:
adjusting the operating thresholds of the model based on the anomaly identified in the alert.

12. The computer-implemented method of claim 1, further comprising:
adjusting the operating thresholds of the model based on a pattern distance matrix identified in the alert.

13. A non-transitory computer-readable storage medium, the non-transitory computer-readable storage medium including instructions that when executed by a computer, cause the computer to perform operations comprising:
receiving a data stream that comprises values of metrics derived from observations of operation of a computing entity over a time window;
forming a model comprising variances of data of the data stream over the time window, the model identifying operating thresholds for each metric based on the variances of the data for each metric in the data stream, wherein the variances are represented as acceleration matrices, and wherein bounds of the operating thresholds are determined using the acceleration matrices;
accessing a value of a metric vector for each metric from the data stream;
comparing the value of the metric vector for each metric with operating thresholds of a corresponding metric from the model, wherein an operating threshold for a first metric is calculated by computing first operating thresholds of the first metric in a first sub-window based on a rate of change of values of the first metric in the first sub-window and computing second operating thresholds for the first metric in a second sub-window based on a rate of change of values of the first metric in the second sub-window;
assigning a first matrix point value in response to the value of the metric vector being within the operating thresholds or a second matrix point value in response to the value of the metric vector being outside the operating thresholds;
forming an anomalous pattern matrix based on the first matrix point value or the second matrix point value of each metric from the data stream;
using the model to compute a steady state distance matrix of the data stream, by calculating a steady state distance between the anomalous pattern matrix and a steady state matrix, the steady state matrix representing a non-anomalous state;
determining that the steady state distance matrix exceeds a steady state threshold that is determined based on the operating thresholds of the model and metric vectors of the data stream;
in response to determining that the steady state distance matrix exceeds the steady state threshold, computing a Hamming distance between the anomalous pattern matrix and a metric matrix of metric vectors from the data stream;
detecting an anomaly in a subsequent time window of the data stream based on the Hamming distance; and
generating, at a computer, an alert indicating the anomaly.

14. A computing apparatus, the computing apparatus comprising:
a processor; and
a memory storing instructions that, when executed by the processor, configure the computing apparatus to perform operations for detecting anomalies in a data stream, the operations comprising:
receiving the data stream that comprises values of metrics derived from observations of operation of a computing entity over a time window;
forming a model comprising variances of data of the data stream over the time window, the model identifying operating thresholds for each metric based on the variances of the data for each metric in the data stream, wherein the variances are represented as acceleration matrices, and wherein bounds of the operating thresholds are determined using the acceleration matrices;
accessing a value of a metric vector for each metric from the data stream;
comparing the value of the metric vector for each metric with operating thresholds of a corresponding metric from the model, wherein an operating threshold for a first metric is calculated by computing first operating thresholds of the first metric in a first sub-window based on a rate of change of values of the first metric in the first sub-window and computing second operating thresholds for the first metric in a second sub-window based on a rate of change of values of the first metric in the second sub-window;
assigning a first matrix point value in response to the value of the metric vector being within the operating thresholds or a second matrix point value in response to the value of the metric vector being outside the operating thresholds;
forming an anomalous pattern matrix based on the first matrix point value or the second matrix point value of each metric from the data stream;
using the model to compute a steady state distance matrix of the data stream, by calculating a steady state distance between the anomalous pattern matrix and a steady state matrix, the steady state matrix representing a non-anomalous state;

determining that the steady state distance matrix exceeds a steady state threshold that is determined based on the operating thresholds of the model and metric vectors of the data stream;

in response to determining that the steady state distance matrix exceeds the steady state threshold, computing a Hamming distance between the anomalous pattern matrix and a metric matrix of metric vectors from the data stream;

detecting an anomaly in a subsequent time window of the data stream based on the Hamming distance; and generating, at the computing apparatus, an alert indicating the anomaly.

15. The non-transitory computer-readable storage medium of claim 13, further comprising instructions that cause the computer to perform operations comprising:

identifying a rate of change of the values of each metric in the data stream over the time window; and determining a top operating threshold and a bottom operating threshold for each metric based on the rate of change of the values of each metric, a range formed between the bottom operating threshold and the top operating threshold for each metric indicative of a non-anomalous rate of change, wherein the operating thresholds for each metric comprise the top operating threshold and the bottom operating threshold for a corresponding metric.

16. The non-transitory computer-readable storage medium of claim 13, further comprising instructions that cause the computer to perform operations comprising:

grouping values of the first metric from the first sub-window that comprises a shorter window of the time window based on a seasonality of the data stream;

grouping values of the first metric from the second sub-window based on the seasonality of the data stream, the second sub-window being contiguous to the first sub-window;

identifying the rate of change of values of the first metric in the first sub-window; and identifying the rate of change of values of the first metric in the second sub-window.

17. The computing apparatus of claim 14, the memory further comprising instructions that configure the computing apparatus to perform operations for detecting anomalies in a data stream, the operations comprising:

identifying a rate of change of the values of each metric in the data stream over the time window; and determining a top operating threshold and a bottom operating threshold for each metric based on the rate of change of the values of each metric, a range formed between the bottom operating threshold and the top operating threshold for each metric indicative of a non-anomalous rate of change, wherein the operating thresholds for each metric comprise the top operating threshold and the bottom operating threshold for a corresponding metric.

18. The computing apparatus of claim 14, the memory further comprising instructions that configure the computing apparatus to perform operations for detecting anomalies in a data stream, the operations comprising:

grouping values of the first metric from the first sub-window that comprises a shorter window of the time window based on a seasonality of the data stream;

grouping values of the first metric from the second sub-window based on the seasonality of the data stream, the second sub-window being contiguous to the first sub-window;

identifying the rate of change of values of the first metric in the first sub-window; and identifying the rate of change of values of the first metric in the second sub-window.

19. The computing apparatus of claim 14, the memory further comprising instructions that configure the computing apparatus to perform operations for detecting anomalies in a data stream, the operations comprising:

forming an anomalous pattern matrix representative of anomalous events in the data stream, wherein the steady state distance matrix is based on the anomalous pattern matrix.

\* \* \* \* \*